T. R. ALMOND.
Bushings for Machinery.

No. 150,456. Patented May 5, 1874.

Witnesses.
John Becker
Frol. Haynes

Thomas R. Almond
by his Attorneys,
Brown & Allen

UNITED STATES PATENT OFFICE.

THOMAS R. ALMOND, OF FITCHBURG, MASSACHUSETTS.

IMPROVEMENT IN BUSHINGS FOR MACHINERY.

Specification forming part of Letters Patent No. 150,456, dated May 5, 1874; application filed October 7, 1873.

*To all whom it may concern:*

Figure 1:
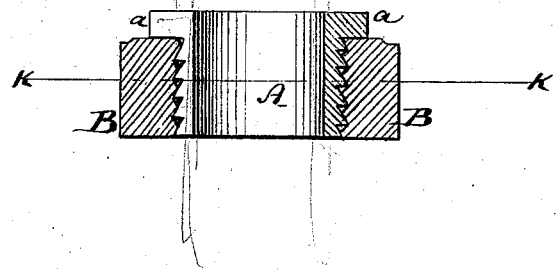
Figure 2:
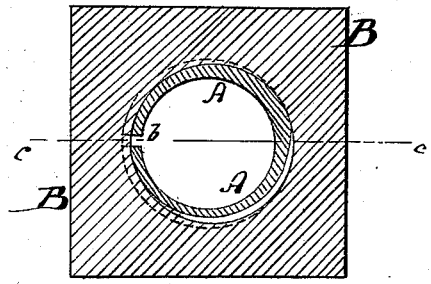

Be it known that I, THOMAS R. ALMOND, of Fitchburg, in the county of Worcester and State of Massachusetts, have invented an Improved Bushing for Machinery, of which the following is a specification:

Figure 1 is a central longitudinal section of my improved bushing, the line $c\ c$, Fig. 2, indicating the plane of section. Fig. 2 is a transverse section thereof on the line $k\ k$, Fig. 1.

Similar letters of reference indicate corresponding parts in both figures.

The object of this invention is to improve and simplify the bearings of machinery, especially to overcome the great difficulty experienced in trying to keep spindles in lathes central and without end motion to the bearings and bushings. My invention consists in the use of a cylindrical bushing which has a screw-thread cut around it, and which is slit or cut longitudinally, and provided with a projecting collar at one end. This bushing is fitted into a female screw, and when applied so far that its collar bears against the female screw, it can still be turned, and will, by turning, be caused to contract in proportion to the degree in which it is turned. The peculiarity of the slotted screw-bushing will be more fully understood by reference to the drawing, in which—

A represents the bushing, and B the screw into which the same is fitted. The bushing, as afore stated, is cylindrical in form, and fitted with a collar or flange, $a$, at its outer end. The screw-thread is cut around it clear up to the collar, and a corresponding screw-thread formed in the nut or receiving-screw B. The bushing is slit or cut open lengthwise, as in Fig. 2, the slot allowing it to spring apart in the manner shown. The screw-thread which is cut into the receiver B must be V-shaped, or at least inclined on that side which faces the collar $a$. When the bushing is screwed into the receiver B until the collar $a$ touches the face of the latter, and the bushing is then still further turned, its screw-thread will, by continued turning, be caused to rotate on the inclined faces of the embracing-screw, and the bushing will thereby be contracted—that is to say, its edges $b\ b$ will gradually approach each other, until they touch entirely, if desired.

The principle of operation is, that the thread of the bushing, rotating on the thread of the screw B, which presents a conical surface, is gradually crowded inward under the continued pressure, the longitudinal displacement of bushing being prevented by the contact of the collar $a$ with the receiver B. Therefore, in turning the bushing after the collar is up to its place, the larger or outer part of the thread on the bushing is brought into the smaller or inner part of the thread of the female screw, and thereby the bush is contracted.

When bushing of this kind is applied to a lathe it will keep the spindle always central. It can also be used as a chuck for holding the work in a lathe, and for many other purposes, such as the bearing of machinery, &c., the great advantage being that the bushing can be made to more or less contract or expand. Instead of having the bushing fitted into the nut B, as shown, and providing its external circumference with a screw-thread, the same results may be reached by threading the internal circumference of the bushing, and applying it around a male screw.

I am aware that slit tubular bushing has already been used with part of its circumference threaded and part made tapering, so that it would be contracted by being screwed farther into the conical shell; also, that bushings threaded along their tapering circumference have already been in use, and tapering bushing of all kinds, and I do not claim such a bushing, as my bushing is not made tapering at all; but I do claim as my invention—

A bushing, A, slit along its entire length, and made with a projecting collar, $a$, at one end, and with a screw-thread extending to the opposite end, and combined with a cylindrical screw, B, that matches the thread of the bushing, so that the bushing will be extended or contracted by riding on the thread of the cylindrical screw B, while its collar $a$ is in contact with the end of said screw, as set forth.

THOS. R. ALMOND.

Witnesses:
EDWARD NEWITT,
JOHN H. PARKER.